United States Patent
Mandl et al.

(10) Patent No.: US 6,288,536 B1
(45) Date of Patent: Sep. 11, 2001

(54) EDDY CURRENT SENSOR

(75) Inventors: Roland Mandl, Ortenburg (DE); Felix Mednikov; Mark Netschaewsky, both of Samara (RU); Karl Wisspeintner, Ortenburg (DE)

(73) Assignee: Microepsilon Messtechnik GmbH & Co. KG, Ortenburg (DE)

( * ) Notice: Subject to any disclaimer, the term of this patent is extended or adjusted under 35 U.S.C. 154(b) by 0 days.

(21) Appl. No.: 09/230,897

(22) PCT Filed: Aug. 4, 1997

(86) PCT No.: PCT/DE97/01640

§ 371 Date: Feb. 2, 1999

§ 102(e) Date: Feb. 2, 1999

(87) PCT Pub. No.: WO98/05929

PCT Pub. Date: Feb. 12, 1998

(30) Foreign Application Priority Data

Aug. 3, 1996 (DE) .............................................. 196 31 438

(51) Int. Cl.[7] .......................... G01N 27/72; G01R 33/12; G01B 7/06; G01B 7/14
(52) U.S. Cl. .......................... 324/225; 324/230; 324/234; 324/207.12; 324/207.16
(58) Field of Search ...................... 324/225, 227, 324/224, 228, 229, 230, 231, 232, 233, 234, 236, 237, 238, 239, 240, 241, 242, 243, 207.12, 207.16

(56) References Cited

U.S. PATENT DOCUMENTS

| | | |
|---|---|---|
| 4,893,079 | 1/1990 | Kustra et al. . |
| 4,915,072 | 4/1990 | Caron et al. . |
| 5,541,510 | 7/1996 | Danielson . |
| 5,629,619 | 5/1997 | Mednikov . |

FOREIGN PATENT DOCUMENTS

| | | |
|---|---|---|
| 0 399 694 | 11/1990 | (EP) . |
| 2 287 341 | 9/1995 | (GB) . |

*Primary Examiner*—Hezron Williams
*Assistant Examiner*—Henry Andersen
(74) *Attorney, Agent, or Firm*—Alston & Bird LLP

(57) ABSTRACT

An eddy current sensor (1) has at least one measuring coil (2) that can be supplied with an alternating current, and an evaluation circuit (3). The eddy current sensor allows the temperature influences on the impedance of the measuring coil to be reliably compensated with a simple design and an evaluation circuit. For this purpose, the eddy current sensor has a compensating coil (4) which can also be supplied with an alternating current and which is arranged closely to the measuring coil, i.e. in thermal contact therewith, in such a way that the electric fields of compensating coil (4) and measuring coil (2) are orthogonal to each other. More particularly, the measuring coil (2) is in an annular form and the compensating coil (4) is wound around the measuring coil in the form of a torus.

17 Claims, 2 Drawing Sheets

EDDY CURRENT SENSOR

BACKGROUND OF THE INVENTION

The invention relates to an eddy current sensor with at least one measuring coil that can be supplied with alternating current, and with an evaluation circuit.

Eddy current sensors of the kind under discussion may be used, for example, for measuring a distance, or even for determining the conductivity of a measuring object. Depending on material and quality of the measuring object, an eddy current sensor may be used to determine even other properties of the surface coating of the measuring object, such as, for example, coating thickness. A further field of application for an eddy current sensor is the thickness determination of thin foils.

Eddy current sensors are frequently used in industrial surroundings, since they are also suitable for measurements under problematic environmental conditions, such as, for example, in the presence of strong magnetic fields, at high temperatures, and at a relatively high degree of pollution. However, strong temperature fluctuations also affect measurements with eddy current sensors. The present invention therefore concerns compensation of such temperature influences on measured data that are obtained with the aid of an eddy current sensor.

Temperature fluctuations affect the measurement results of an eddy current in two respects. First, the complex impedance of the measuring coil changes, in particular of the real parts of the complex impedance. Besides that, however, it is also possible to detect even a small temperature dependence of the imaginary part of the complex impedance. Second, the conductivity of the measuring object or the material thereof changes likewise along with the temperature. In certain temperature ranges, there exists an almost linear relationship between the temperature of the measuring object and its conductivity. Since conductivity of the measuring object material becomes effective on the eddy currents that are induced in the material via the measuring coil, the conductivity of the measuring object material influences again the measuring coil or its impedance via the feed back of the coupling. A complete compensation of the temperature influence on the measured data will therefore be possible only when both effects are compensated, i.e., both the temperature influence on the impedance of the measuring coil and the temperature influence on the conductivity of the measuring object material.

International Patent Application PCT/DE 93/00703, Publication WO 94/03778 and corresponding U.S. Pat. No. 5,629,619, disclose a method of compensating temperature influences on the output signal of a measuring coil, wherein a dc voltage is superposed on the ac voltage that supplies the measuring coil. The ac component of the output signal of the measuring coil is influenced both by the measuring object and by temperature influences. Contrary thereto, the dc voltage component of the output signal is subjected only to temperature influences, so that the temperature influences can be determined, isolated via the dc voltage component, and thus be considered and compensated in the evaluation of the dc voltage component of the output signal.

In the known method, the dc voltage component of the output signal of the measuring coil thus assists in only compensating the temperature influence on the real part of the measuring coil impedance. It is thus not possible to eliminate a possible temperature influence on the imaginary part of the measuring coil impedance. The temperature influence on the output signal of the measuring coil, which is due to a temperature dependence on the conductivity of the measuring object, is likewise compensated in this instance only when the measuring coil and the measuring object are subjected to the same temperature. In particular at high temperatures, this condition is often not met.

It is therefore the object of the invention to describe an eddy current sensor of the kind under discussion that facilitates with a simple construction and an evaluation circuit a reliable compensation of temperature influences both on the real part and on the imaginary part of the impedance of the measuring coil.

SUMMARY OF THE INVENTION

The above and other objects and advantages of the present invention are achieved by the provision of an eddy current sensor having at least one measuring coil and at least one compensating coil, both of which can be supplied with alternating current. The compensating coil is arranged in the direct vicinity of the measuring coil, i.e., in thermal contact therewith, so that the electromagnetic fields of the compensating coil and the measuring coil are orthogonal to each other.

In accordance with the invention, it has first been recognized that for evaluating the measuring signal of an eddy current sensor, it is normally necessary that the real part $R_A$ and the imaginary part $X_A$ of impedance $Z_A$ of the measuring coil be known per se, so that it is also possible to determine the phase angle $\phi$ of complex impedance $Z_A$ via the quotient of imaginary part $X_A$ and real part $R_A$, namely via the equation $$\tan \phi = X_A/R_A.$$

this end, it is necessary to eliminate not only the temperature influence on the real part of the complex coil impedance, but also the temperature influence on the imaginary part. In accordance with the invention, it has further been recognized that it is possible to determine the temperature influence on the imaginary part of the impedance of the measuring coil in the simplest manner with the aid of a compensating coil that is subjected to the same temperature influences as the measuring coil. In accordance with the invention, it is therefore proposed to associate to the measuring coil a compensating coil that can likewise be supplied with alternating current and is in thermal contact with the measuring coil, so that no temperature gradient can develop between the measuring coil and the compensating coil. It has still further been recognized by the present invention that it is possible to reliably detect with the aid of the compensating coil the temperature influence on the imaginary part of the measuring coil impedance only when the measuring object does not influence the impedance of the compensating coil. It is therefore proposed by the present invention to arrange the compensating coil such that the electromagnetic fields of the compensating coil and the measuring coil are orthogonal to each other. In this instance, the measuring object will practically have no influence on the impedance of the compensating coil, when the eddy current sensor of the present invention is positioned such that the presence of the measuring object is maximally effective on the impedance of the measuring coil. If one subtracts the complex impedances of the measuring coil and the compensating coil from each other in components by suitable circuit measures, one will obtain exclusively distance-dependent and material dependent impedance values. The sensor arrangement as proposed by the present invention facilitates in this manner a satisfactory compensation of the temperature influences on the impedance of the measuring coil.

Basically, there are different possibilities of a constructional realization of the coil arrangement of the eddy current sensor in accordance with the invention. In a particularly advantageous variant, the measuring coil has an annular form around which the compensating coil is wound in a fashion similar to the winding of a toroidal core transformer. The spatial vicinity of the measuring coil and compensating coil that results from this coil arrangement, ensures that the two coils are at the same temperature. Furthermore, it is here ensured that the electromagnetic field generated by the compensating coil is orthogonal to the electromagnetic field of the measuring coil.

As regards stability of the coil arrangement, it will be of advantage, when the measuring coil is wound around a coil form. The coil form may be of a dielectric material, for example, plastic. In this instance, the coil form would not affect the impedance of the measuring coil. However, it will be especially advantageous, when the coil form is made of a ferromagnetic material, since it acts in this instance like a coil core in a signal-amplifying manner.

With respect to a simple and reliable evaluation of the sensor signals, it will be especially advantageous, when the impedance of the measuring coil and the impedance of the compensating coil are substantially the same under identical environmental conditions. This may be realized by a suitable selection of the coil parameters, such as, for example, wire diameter, number of turns, geometry, etc. Temperature compensation will then occur by a simple, componentwise subtraction of the complex impedances of measuring coil and compensating coils, without requiring further reaching, additional computations.

The thus-adjusted impedance $Z_C$ of the measuring coils or the adjusted real part $R_C$ and the adjusted imaginary part $X_C$ can be determined both in terms of software, for example, with the aid of a correspondingly programmed microprocessor, and in terms of hardware, i.e. by way of the circuitry.

For determining the adjusted impedances of the measuring coil by way of the circuitry, it will be especially advantageous, when the measuring coil and the compensating coil are connected to a common source of voltage that supplies the orthogonal voltage components. In a particularly advantageous manner, this may be a sine/cosine-wave generator. In this instance, it will be possible to determine the real part and imaginary part of the coil impedances by a simple multiplication of the respective output signals of the measuring coil and the compensating coil with the cosine component or sine component of the source of voltage.

To this end, the evaluation circuit could comprise two multipliers each subsequent to the measuring coil and to the compensating coil. In this instance, each multiplier is supplied with the output voltage of the corresponding coil and one of the two voltage components of the source of voltage. At the output of the one multiplier, it would be possible to tap the real part of the respective coil impedance, whereas the corresponding imaginary part could be tapped at the output of the other multiplier. It may be advantageous to connect a low-pass filter at the output of each multiplier, so as to gate out higher-frequency components of the output signals of the multipliers that occur as result of the circuitry. The difference between the real parts and the imaginary parts of the coil impedances can now be determined in a simple manner with the aid of adders subsequent to the respective multipliers.

In another advantageous variant of the eddy current sensor according to the invention, it would also be possible to evaluate the output signals of the measuring coil and the compensating coil with the aid of a bridge circuit. To this end, the measuring coil and the compensating coil could be connected, if need be, together with resistors R1 and R2 to a bridge circuit and be supplied in an advantageous manner with the orthogonal components of a corresponding source of ac voltage.

However, it would also be possible to complete the measuring coil and the compensating coil with capacitors C1 and C2 to an oscillating circuit. Finally, it would also be possible to operate the measuring coil and the compensating coil in a ringing oscillator.

In a particularly advantageous variant of the eddy current sensor according to the invention, the measuring coil has a small extension in radial direction, i.e. a relatively small radius r.

In this connection, it has been recognized that variations in the conductivity of the measuring object material that result from temperature fluctuations lead to changes in the phase angle $\phi$ of the complex impedance of the measuring coil. However, since the phase angle $\phi$ is also influenced by the measuring object, for example, the distance between the measuring object and the measuring coil, it is extremely difficult to determine the temperature influence independently of the measuring object. Until now, it has not been possible to define an analytically closed, solvable inverse function of the problem with any desired geometry. On the condition of a small extension of the measuring coil in radial direction, however, it is possible to find an approximation model that is analytically reversible. Accordingly, the phase angle $\phi$ or $\tan\phi$ is a mere function of the conductivity or the temperature of the measuring object and, thus, no longer dependent on the measuring distance, the spacing between the measuring object and the eddy current sensor. The estimated measuring distance is a function of the geometry and of the measuring object material and can be determined directly from the real part and the imaginary part of the measuring coil impedance. The distance-dependent component of $\tan\phi$ may be corrected after computing the measuring distance. With that, errors of the approximation are compensated. Despite the originally error-prone approximation, measuring distance and conductivity of the measuring object material thus remain computable separately from each other. In the case of ferromagnetic materials, wherein the relative permeability of the measuring object material additionally influences $\tan\phi$, it is nevertheless possible to compute likewise the ratio of permeability to conductivity of the measuring object material, which suffices in most cases for a material identification. Likewise in this instance, the temperature of the measuring object has no influence on the computation of the measuring distance.

On the condition that the phase angle $\phi$ or $\tan\phi$ can be determined as a function of the temperature, it is therefore possible to determine with the aid of the eddy current sensor according to the invention quite different measurable variables. In this connection, it will be of advantage when the evaluation circuit comprises a programmable microprocessor.

Thus, it is possible to determine, for example, based on corresponding physical relations and with the knowledge of sensor-specific constants, the distance h between a nonferromagnetic measuring object and the eddy current sensor or measuring coil as $$h = k1 \ln[k2/X_c f(\tan \phi, \omega, r)].$$

Furthermore, it is possible to determine the conductivity $\sigma$ of a measuring object as $$\sigma = f(k3 \tan^2\phi/\omega r^2).$$

As initially mentioned, it is also possible to use the eddy current sensor of the present invention for determining the thickness d of a thin foil. With the conductivity σ of the foil being known, the thickness d is $$d = f(k4 \tan\phi / r\omega\sigma).$$

Furthermore, it is also possible to determine the distance h between the eddy current sensor and or measuring coil and a thin foil. In this instance, however, the thickness d of this foil should be smaller than the eddy current penetration depth of the measuring coil. h will then be $$h = f(k5 \tan^2\phi / (1+\tan^2\phi) X_c).$$

Finally, the eddy current sensor of the present invention can also be used to determine the distance h between a ferromagnetic measuring object and the eddy current sensor or measuring coil. In this instance, h will be $$h = k1 \ln[k2/X_c f(\mu_r/\sigma, \omega, r)],$$

where $$\mu_r/\sigma = (k6 r \sqrt{2}(\tan\phi + \sqrt{2+\tan^2\phi}))^2.$$

In the foregoing formulae, k1 to k6 indicate predeterminable constants. ω represents the angular frequency of the supply voltage for the measuring coil and compensating coil.

When a so-called voltage controlled oscillator (VCO) is used as source of voltage, it will be possible to adjust the angular frequency ω of the supply voltage, so that the adjusted imaginary part of the impedance equals zero ($X_c = 0$). Thus, tanφ equals likewise zero. As a result, the determination of the above-listed measurable variables is simplified quite considerably.

BRIEF DESCRIPTION OF THE DRAWINGS

Some of the objects and advantages of the present invention having been stated, others will become apparent as the description proceeds, when considered in conjunction with the accompanying drawings, in which.

DETAILED DESCRIPTION OF THE PREFERRED EMBODIMENTS.

Figure 1:
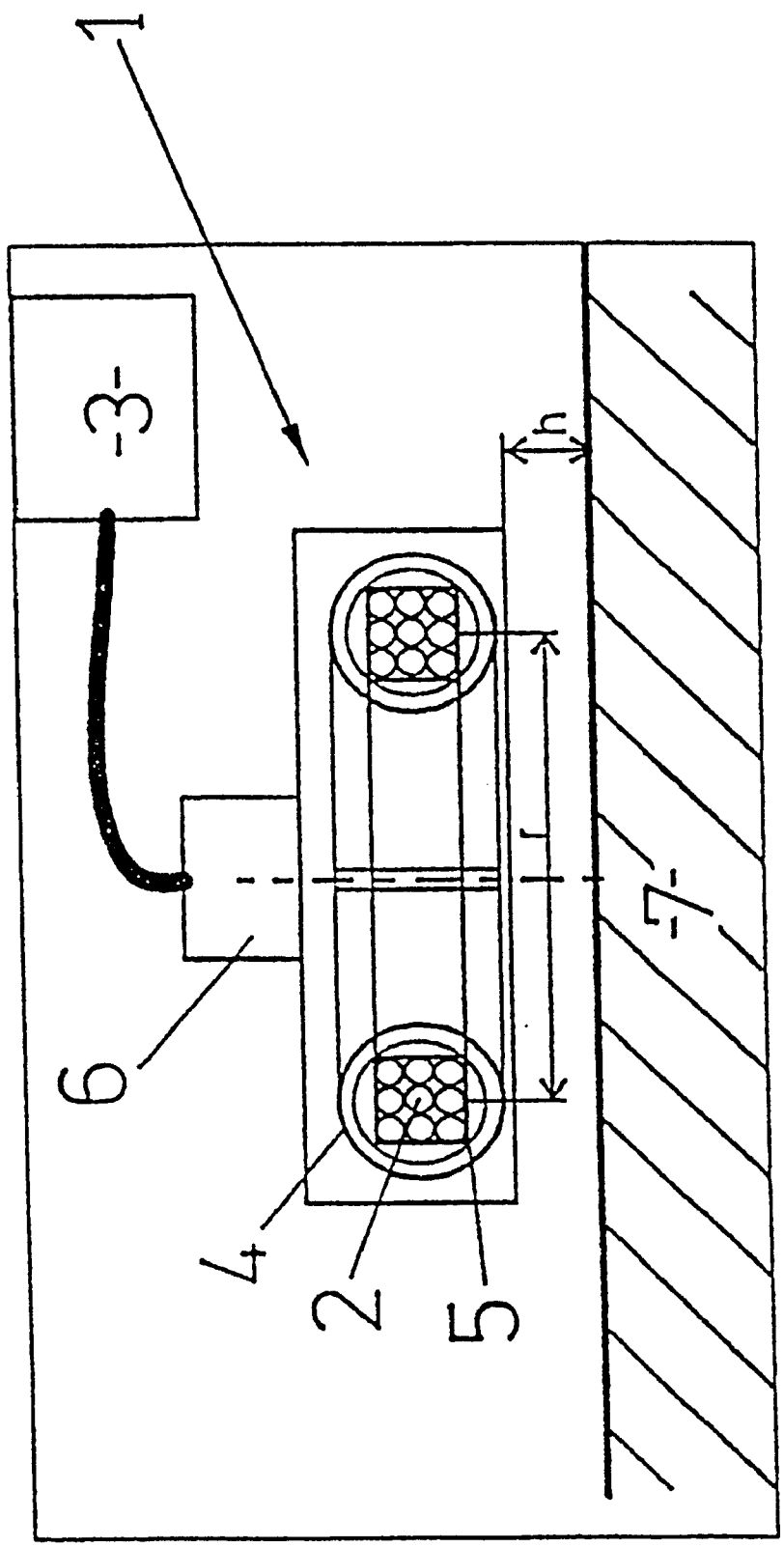
FIG. 1 shows the constructional layout of an eddy current sensor in accordance with the invention.

FIG. 1 illustrates an eddy current sensor 1 that comprises a measuring coil 2 which can be supplied with alternating current, and an evaluation circuit 3.

In accordance with the invention a compensating coil 4 that can also be supplied with alternating current is arranged in the direct vicinity of the measuring coil 2. This compensation coil 4 is constructed and arranged with respect to the measuring coil 2 in such a manner that the electromagnetic fields of the compensating coil 4 and measuring coil 2 are orthogonal to each other. As a result of arranging the compensating coil 4 in the direct vicinity of measuring coil 2, the two coils 2 and 4 are in thermal contact, so that practically no temperature gradient can develop between these coils 2 and 4.

In the illustrated embodiment, the measuring coil 2 has an annular coil form around which the compensating coil 4 is wound in the fashion of the winding of a toroidal core transformer. In this connection, the compensating coil 4 is constructed in the form of a toroidal coil. The measuring coil 2 is thus arranged like a torroidal core in the interior of the compensating coil 4.

At this point, it should again be pointed out that the spatial configuration of the coil arrangement is intended to ensure that the same environmental conditions, such as temperature, temperature gradient, shielding influence, moisture, etc. act upon both coils, namely the measuring coil and the compensating coil.

In the illustrated embodiment, the measuring coil 2 is wound on a coil form 5 in the shape of a plastic ring, so that it constitutes an air-core coil. However, the coil form 5 could also be made of a ferromagnetic material and therefore act like a coil core that amplifies the output signal of the measuring coil 2.

In the case of the eddy current sensor 1 shown in FIG. 1, there are adapted not only the orientations of the electromagnetic fields of measuring coil 2 and compensating coil 4, but also the coil impedances. The impedance of measuring coil 2 and the impedance of compensating coil 4 are intended to be substantially the same under identical environmental conditions. This adjustment of the coil impedances can be realized in a simple manner by a corresponding selection of the coil parameters, namely the wire material, wire diameter, number of turns, geometry, etc. Important is that the real and imaginary parts of the two coil impedances are equal in pairs.

In the illustrated embodiment, the coil arrangement is accommodated in a casing 6. Suitable materials for the casing 6 are plastic, ceramic, ferromagnetic or even nonferromagnetic steel.

The radius r of the measuring coil 2 of the illustrated eddy current sensor 1 is dimensioned such that the phase angle φ of the impedance of the measuring coil 2 or tanφ is a mere function of the conductivity of a respective measuring object 7 and does not depend on the measuring distance h, i.e. the spacing between the eddy current sensor 1 and the surface of the measuring object 7.

Figure 2:
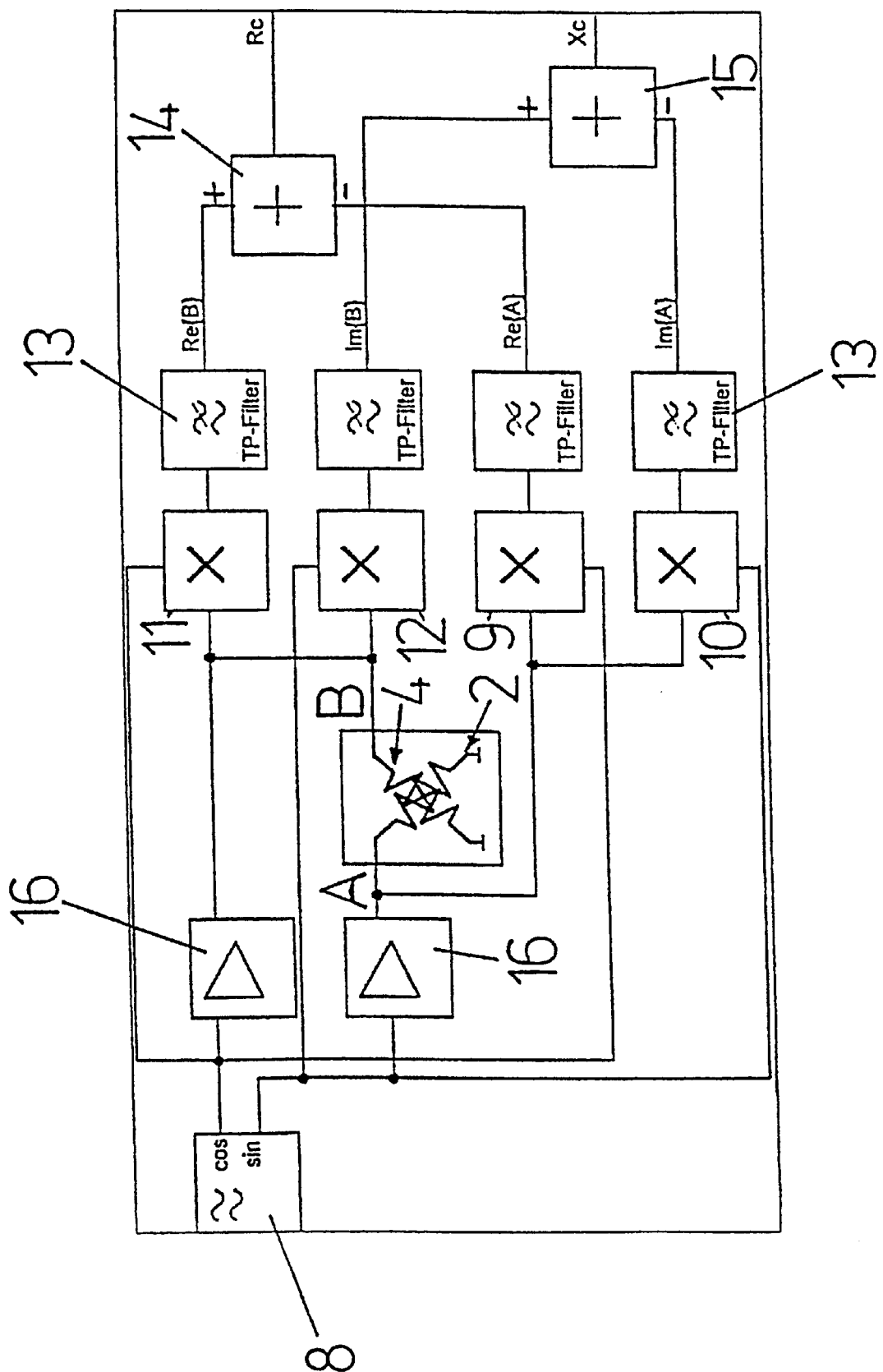
FIG. 2 shows an embodiment of a measuring circuit with an eddy current sensor of the present invention.

The measuring circuit of FIG. 2 for a eddy current sensor according to the invention comprises a source of voltage that is realized in the form of an ac voltage generator (VCO) 8 with sine and cosine outputs and a variable angular frequency. This voltage control oscillator (VCO) 8 generates the supply voltage of the measuring coil 2 and the compensating coil 4.

At the output A of the coil arrangement, the impedance of the measuring coil 2 can be tapped. Likewise, it is possible to tap the impedance of compensating coil 4 at the output B of the coil arrangement. Connected to the outputs A and B are respectively two multipliers 9 and 10 or 11 and 12. The multipliers 9 and 11 link each the impedances of the measuring coil 2 and compensating coil 4 to the cosine component of the supply voltage, so that the real part of the corresponding impedance is present at the output of multipliers 9 and 11. The multipliers 10 and 12, however, link each the impedances of the measuring coil 2 and compensating coil 4 to the sine component of the supply voltage, so that the imaginary part of the corresponding impedance is present at each output of these multipliers 10 and 12.

It should here be remarked that constructionally necessary differences between the initial "no-load" impedances of the measuring coil and compensating coil can be compensated in the circuit by different amplification factors subsequent to the multipliers. In the present embodiment, low-pass filters 13 are connected to the outputs of multipliers 9–11. These low-pass filters are intended to gate out higher-frequency signal components that occur as a result of the circuit, but are not important within the scope of the evaluation of the determined coil impedances.

The output signals of multipliers 9 and 11 which represent essentially the real parts of the impedance of measuring coil 2 and the impedance of compensating coil 4 are supplied to an adder 14 for determining a difference. The output signal of this adder 14 represents now the adjusted real part of the impedance of measuring coil 2. Accordingly, an adder 15 is provided that receives the outputs of multipliers 10 and 12, namely the imaginary parts of the impedance of measuring coil 2 and of the impedance of compensating coil 4. Therefore, the output signal of the adder 15 represents the adjusted imaginary part of the impedance of the measuring coil.

To prevent the output signals of measuring coil 2 and compensating coil 4 from superposing upon the sine and cosine components of the supply voltage, buffers 16 are interposed respectively between the source of voltage 8 and measuring coil 2 and compensating coil 4. These buffers prevent such a feedback.

In conclusion, it should also be remarked in connection with FIG. 2 that same illustrates only one possibility of a circuit evaluation of the impedances of the measuring coil and compensating coil. An evaluation may also occur, for example, with the aid of a suitable bridge circuit or oscillating circuit. Finally, it would also be possible to operate the measuring coil and the compensating coil in a ringing oscillator.

What is claimed is:

1. Eddy current sensor with an evaluation circuit, with at least one measuring coil, and with at least one compensating coil, wherein the measuring coil a nd the compensating coil can be supplied with alternating currenr, and the compensating coil is arranged in direct vicinity of the measuring coil, so that the electromagnetic fields of the compensating coil and measuring coil are orthogonal to each other, wherein the measuring coil has an annular form and the compensating coil is wound around the measuring coil in the form of a torus, so that th e compensating coil is in thermal c ontact with the measu ring coil.

2. Eddy current sensor of claim 1, wherein the measuring coil is wound around a coil form.

3. Eddy current sensor of claim 2, wherein the coil form is formed of a dielectric material.

4. Eddy current sensor of claim 2, wherein the coil form is formed of a ferromagnetic material.

5. Eddy current sensor of claim 1, wherein the impedance of the measuring coil ($Z_A=R_A+X_A$) and the impedance of the compensating coil ($Z_B=R_B+X_B$) are essentially the same under identical environmental conditions.

6. Eddy current sensor of claim 1, wherein the evaluation circuit comprises means for determining the adjusted real part $R_C$ of the impedance of the measuring coil as a difference between the real parts of the impedances of the measuring coil and the compensating coil ($R_C=R_B-R_A$), and that the evaluation circuit comprises means for determining the adjusted imaginary part $X_C$ as a difference between the imaginary parts of the impedances of the measuring coil and the compensating coil ($X_C=X_B-X_A$).

7. Eddy current sensor of claim 1, wherein the measuring coil and compensating coil are connected to a source of voltage that supplies orthogonal voltage components, preferably a sine/cosine-wave generator.

8. Eddy current sensor of claim 7, wherein the evaluation circuit comprises two multipliers each subsequent to the measuring coil and compensating coil , each multiplier receiving the output voltage of the corresponding coil and one of the two voltage components of the source of voltage, so that at the output of the one multiplier it is possible to tap respectively the real part $R_A$ and $R_B$ of the coil impedance, whereas the imaginary part $X_A$ or $X_B$ of the coil impedance can each be tapped at the output of the other multiplier.

9. Eddy current sensor of claim 8, wherein low-pass filters are connected to the outputs of the multipliers.

10. Eddy current sensor of claim 8, wherein an adder is connected to respectively two multipliers at whose outputs the real parts or the imaginary parts of the coil impedances can be tapped.

11. Eddy current sensor of claim 1, wherein the measuring coil and the compensating coil are connected to a bridge circuit.

12. Eddy current sensor of claim 11, wherein the bridge circuit comprises resistors R1 and R2.

13. Eddy current sensor of claim 1, wherein the measuring coil and the compensating coil with capacitors C1 and C2 form an oscillating circuit.

14. Eddy current sensor of claim 1, wherein the measuring coil and the compensating coil are operated by a ringing oscillator.

15. Eddy current sensor of claim 1, wherein the evaluation circuit comprises a preferably programmable microprocessor for evaluating the adjusted real part $R_C$ and the adjusted imaginary part $X_C$ of the impedance of the measuring coil.

16. Method of operating an eddy current sensor of claim 1, wherein the real part and the imaginary part of the impedances of the measuring coil and compensating coil are each determined, that by subtraction of the real parts and imaginary parts, the adjusted real part $$R_C=R_B-R_A$$

and the adjusted imaginary part $$X_C=X_B-X_A$$

of the impedance of the measuring coil are determined.

17. Method of claim 16 for operating an eddy current sensor, wherein by dividing the adjusted imaginary part and the adjusted real part the phase angle $\phi$ of the impedance of the measuring coil is determined from $$\tan\phi=X_C/R_C.$$

\* \* \* \* \*